Feb. 24, 1925.                                                1,527,590
M. KRIS
MEANS FOR FASTENING THE FISHPLATES OF RAIL JOINTS
Filed July 13, 1923
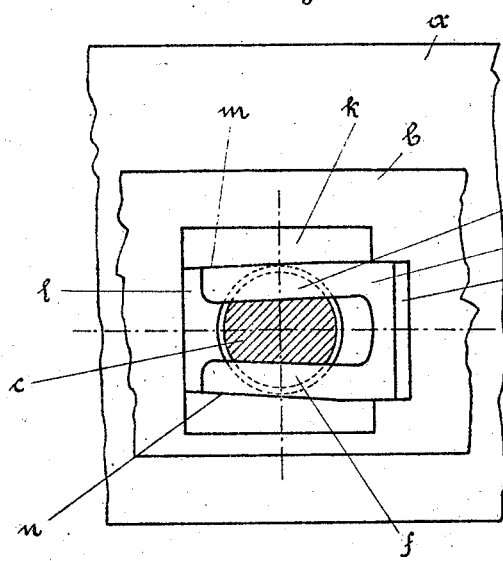
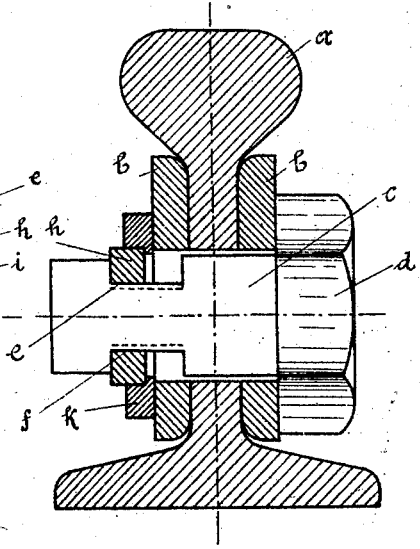
Inventor
Markus Kris
by Langner, Parry, Card + Langner
Attys.

Patented Feb. 24, 1925.

1,527,590

UNITED STATES PATENT OFFICE.

MARKUS KRIS, OF VIENNA, AUSTRIA.

MEANS FOR FASTENING THE FISHPLATES OF RAIL JOINTS.

Application filed July 13, 1923. Serial No. 651,403.

*To all whom it may concern:*

Be it known that I, MARKUS KRIS, citizen of Austria, residing at Vienna, Austria, have invented new and useful Improvements in Means for Fastening the Fishplates of Rail Joints, of which the following is a specification.

The screw bolts for fastening the fishplates of rail joints have the drawback that the nuts of these bolts get rusty within a short time and cannot be turned in the threads of the bolt for tightening the screw if the joint slackens, or for removing the nut if the joint should be dismounted. In such a case the nut or the bolt will be destroyed if the power employed in trying to screw the nut is excessive.

Therefore several kinds of joints using keys instead of screw nuts have already been proposed, the bolts being provided with grooves or recesses for the keys to be driven in. With one of these constructions the end portion of the bolt has two transverse grooves one diametrical to the other into which grooves a fork-shaped key is driven, a washer being used therewith which is provided with two projections. When driving the fork-shaped key into the transverse grooves of the bolt the prongs of the key enter into the space between the two projections of the washer, the prongs being prevented thereby from spreading. But considering the violent concussions to which the rail joints are subjected, joints using keys as proposed hitherto are not reliable; but if the keys are secured by special means, say by locking devices having engaging teeth, they cannot be removed without destroying one or more parts of the device.

The present invention relates to a joint using a fork-shaped key to be driven into two transverse grooves arranged in opposition on the end portion of the bolt; but it differs from the known device as mentioned above by the feature that the bottoms of the two grooves as well as the two prongs of the key are slightly convergent in the direction in which the key, the prongs of which are springy, is driven into the grooves. By this convergency, any tendency of the key to get loose or to fall off is altogether prevented. But the intended loosening of the joint is possible without destroying any part.

One embodiment of a joint according to my invention is represented in the drawing in Fig. 1 in elevation, in Fig. 2 in a cross section and in Fig. 3 in a plan of the end portion of the bolt.

The bolt $c$ used for joining the rail $a$ and the fish-plates $b$ is provided on its end with a head $d$ and on one other end portion with two transverse grooves $e$ and $f$, arranged in opposition one to the other, the bottoms of these grooves being slightly convergent. The side walls $g$ of these grooves next to the end of the bolt are inclined (see Fig. 3), the inclination of the side walls $g$ being directed to the converging joint of the bottoms of the transverse grooves $e$ and $f$. A fork-shaped key $h$ serves to lock the bolt $c$ and has two prongs which are springy one towards the other. These prongs are driven into the grooves $e$, $f$ of the bolt $c$ in the direction of the convergency of the bottoms of these grooves, the nose $i$ of the key $h$ serving to receive the strokes of a hammer. When the key $h$ comes in full engagement with the grooves $e$, $f$, the spring-force of the prongs prevents the key from any reverse movement and from getting loose.

In order to increase the security against an accidental loosening of the joint a washer $k$ may be used, having a transverse groove $l$, the side walls $m$, $n$ of which are convergent to the same degree as the bottoms of the transverse grooves $e$, $f$ of the bolt, so that this washer may be positioned in relation to the bolt in such a manner that the side walls $m$, $n$ are parallel to the bottoms of the grooves $e$, $f$. The convergency of these side walls $m$, $n$ may also be a little more pronounced than the convergency of the bottoms of the grooves $e$, $f$. The prongs of the key $h$ are driven into the space between the grooves of the bolt and the side walls $m$, $n$ of the washer $k$ and are thereby pressed firmly into the grooves of the bolt, so that the friction on the engaging surfaces makes any accidental loosening of the joints impossible. The wedge-shaped side surfaces of the key are in intimate contact with the side walls $g$ of the transverse grooves $e$, $f$ and thereby press the head $d$ of the bolt against the adjacent fish plate $b$ which is pressed against the rail $a$, while the washer $k$ is pressed in the opposite direction, so that all parts are pressed together.

The loosening of the joint is effected by driving the key $h$ out of the transverse grooves of the bolt by strokes applied to the nose $i$. Even in the event of the key getting rusty, it is possible to loosen it without breaking. But if it happens that the key breaks, the bolt at all events remains intact so that only the key has to be replaced, no considerable expense being incurred thereby.

For temporary tracks or tracks for portable railways, in which the joints have often to be loosened, the washer $k$ can be dispensed with.

Obviously the invention can be embodied in different forms as regards its constructive form.

What I claim is:

1. Means for fastening the fish-plates of rail-joints comprising a bolt having on one end portion two transverse grooves arranged in opposition one to the other, the bottoms of these grooves being slightly convergent, and a fork-shaped key the prongs of which are slightly springy and are convergent, the key being adapted to be driven into the said grooves in the direction of the convergency of their bottoms.

2. Means for fastening the fish-plates of rail-joints comprising a bolt having on one end portion two transverse grooves arranged in opposition one to the other, the bottoms of these grooves being slightly convergent and a fork-shaped key, the prongs of which are slightly springy and are convergent, the key being provided with a nose for driving it into the grooves of the bolt and for loosening it from its engagement with the grooves, the key being driven into the grooves in the direction of the convergency of the bottoms.

3. Means for fastening the fish-plates of rail-joints, comprising a bolt having on one end portion two transverse grooves arranged in opposition one to the other, the bottoms of the grooves being slightly convergent and the side walls of the grooves next to the end of the bolt being inclined, and a fork-shaped key, the prongs of which are slightly springy and are convergent, the key being adapted to be driven into the grooves in the direction of the convergency of their bottoms.

4. Means for fastening the fish-plates of rail-joints comprising a bolt having on one end portion two transverse grooves arranged in opposition one to the other, the bottoms of which are slightly convergent, a fork-shaped key, the prongs of which are slightly springy and are convergent, the key being adapted to be driven into the grooves in the direction of the convergency of their bottoms, a washer having convergent depressions arranged on the bolt so that the prongs of the key driven into the grooves fit respectively into a space between the depression and the grooves of the bolt and are thus firmly pressed into the grooves and prevented from spreading.

5. Means for fastening the fish-plates of rail-joints comprising a bolt having on one end portion two transverse grooves arranged in opposition one to the other, the bottoms of the grooves being slightly convergent, a fork-shaped key, the prongs of which are springy and convergent, the key being adapted to be driven into the grooves in the direction of the convergency of their bottoms, a washer so positionable on the bolt and having a transverse channel, the side walls of which are of at least the same convergency as are the bottoms of the grooves of the bolt, that the prongs of the key are firmly pressed into the grooves of the bolt by the channel side walls when the key is driven into a space between the grooves and the side walls of the channel in the washer.

6. Means for fastening the fish-plates of rail-joints comprising a bolt having on one end portion two transverse grooves arranged in opposition one to the other, the bottoms of these grooves being slightly convergent and the side walls of these grooves next to the end of the bolt being inclined in the direction of the convergency of the bottoms of the two transverse grooves, a fork-shaped key the prongs of which are springy and convergent, the key being adapted to be driven into the said grooves in the direction of the convergency of their bottoms and a washer having a transverse channel, the side walls of which are of at least as great convergency as the bottoms of the grooves of the bolt, and so positionable on the bolt that the prongs of the key are firmly pressed into the grooves of the bolt when it is driven into a space between the grooves and the side walls of the channel of the washer.

Signed at Vienna, Austria, this 18th day of June, 1923.

MARKUS KRIS.

Witnesses:
SIEGFRIED NEUTERA,
CARL LOUDENBERG.